US 6,632,063 B1

(12) United States Patent
Karlsen et al.

(10) Patent No.: US 6,632,063 B1
(45) Date of Patent: Oct. 14, 2003

(54) METHOD AND AN ARRANGEMENT FOR FILING A SILO

(75) Inventors: Morten Karlsen, Øvre Årdal (NO); Are Dyrøy, Porsgrunn (NO)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 09/914,616

(22) PCT Filed: Feb. 25, 2000

(86) PCT No.: PCT/NO00/00066
§ 371 (c)(1),
(2), (4) Date: Nov. 9, 2001

(87) PCT Pub. No.: WO00/51924
PCT Pub. Date: Sep. 8, 2000

(30) Foreign Application Priority Data

Mar. 1, 1999 (NO) .......................... 19990998

(51) Int. Cl.[7] ............................. B65G 1/00
(52) U.S. Cl. .................. 414/299; 414/304; 406/155; 406/168
(58) Field of Search ............... 406/155, 168; 414/304, 293, 299

(56) References Cited

U.S. PATENT DOCUMENTS

| | | | |
|---|---|---|---|
| 2,010,231 A | * | 8/1935 | Heist .................. 55/413 |
| 2,491,446 A | * | 12/1949 | Hagerbaumer ............ 23/1 |
| 4,277,205 A | | 7/1981 | Meunier |
| 4,511,291 A | * | 4/1985 | Quates et al. .......... 406/128 |
| 4,534,653 A | | 8/1985 | Courtay |
| 5,567,090 A | * | 10/1996 | Basak et al. ........... 406/155 |

FOREIGN PATENT DOCUMENTS

| | | |
|---|---|---|
| DE | 4207578 | 9/1993 |
| DE | 9408840 | 9/1994 |
| SE | 424070 | 6/1982 |
| WO | 8902866 | 4/1989 |

OTHER PUBLICATIONS

POSTEC Newsletter No. 16, Dec. 1997, by Are Dyrøy and Gisle G. Enstad, entitled "An Anti–Segregation Tube to Counteract Air Current Segregation", pp. 27–30.

* cited by examiner

Primary Examiner—Joseph Dillon
(74) Attorney, Agent, or Firm—Wenderoth, Lind & Ponack, L.L.P.

(57) ABSTRACT

A method and an apparatus for filling a silo (1) with a fluidizable material. The arrangement includes conveying devices (5, 9) for supplying material to an upper area of the silo and a central material distributor (10). The material distributor includes a tank (29) which has an inlet (28) and one or more distributor pipes (26, 26') for distributing material to one or more feed units (11, 11')which convey the material down towards the surface of the material in the silo.

19 Claims, 2 Drawing Sheets

METHOD AND AN ARRANGEMENT FOR FILING A SILO

BACKGROUND OF THE INVENTION

1. Filed of the Invention

Figure 1:
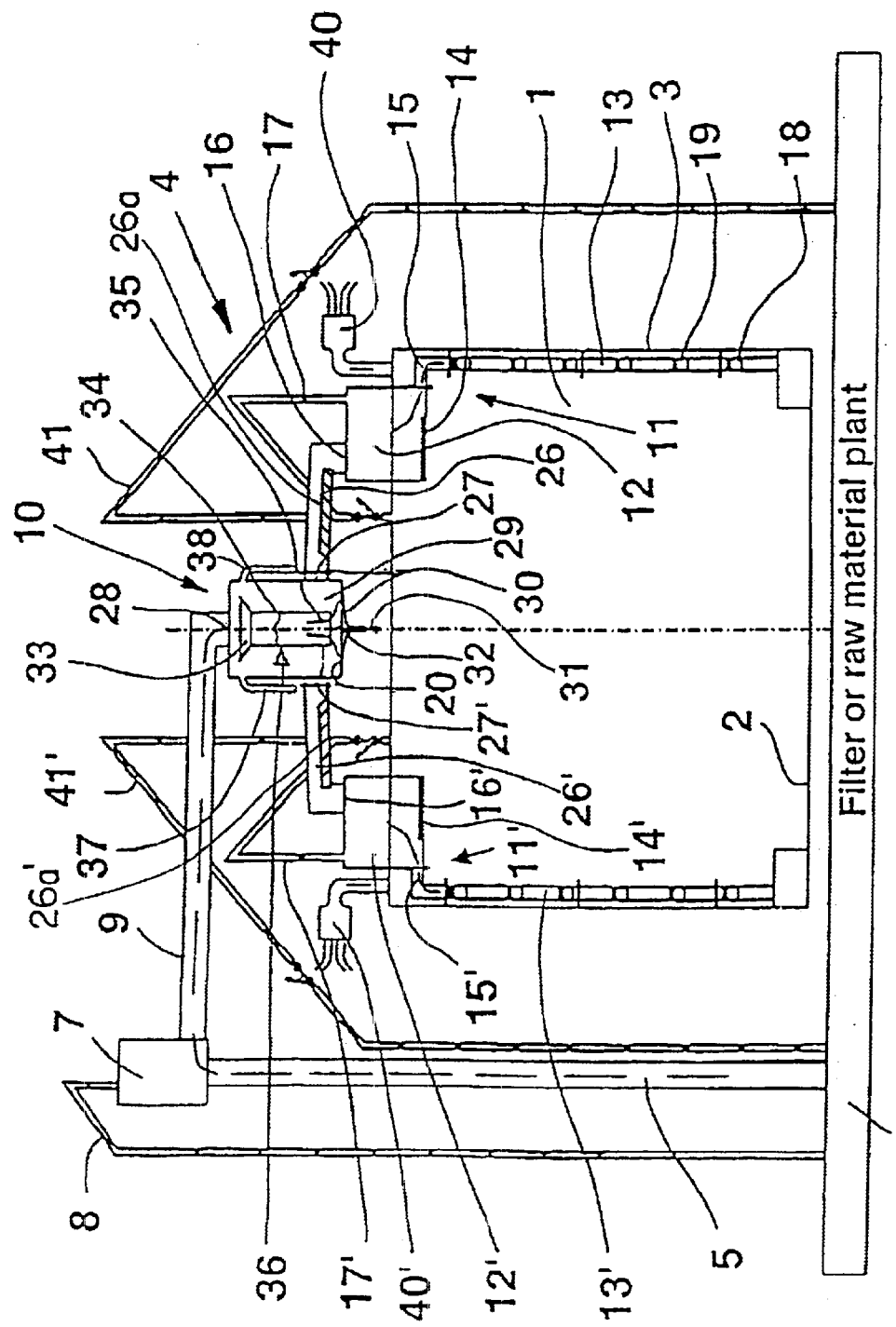

The present invention concerns a method and an arrangement for filling a silo.

2. Description of Related Art

In industries in which large quantities of fluidizable material are handled, for example oxide for the aluminium industry, segregation problems arise with the current systems. Such segregation means that local variations can arise with regard to the accumulation of the material's lower (finer) and upper (coarser) fractions. The segregation is initiated during the filling operation, in which large movements of air can easily occur in the silo with consequent accumulation of finer fractions, depending on the geometry of the silo, particularly out by the silo's walls. During emptying or removal of mass from the silo, there can subsequently be problems with varying fractions, which, in turn, can also result in operational disturbances downstream of the silo such as blockages in the silo and accompanying transport systems. Operational disturbances in the silo itself or downstream of the silo can result in an increased possibility of discharge of fine dust to the environment. In connection with the production of aluminium, such operational disturbances can result in undesired situations in the cells with sludge formation, anode damage, blockage of point feeders, etc. so that the cells have to be "opened" to implement various measures, with an increased risk of the emission of heat and fluoride gases to the environment.

DE-U1-9408840 discloses a storage silo having a material distributor centrally located at the top part of the silo. The distributor comprises a container with a centrally top-mounted inlet through which material is fed into the container, and a centrally arranged outlet in its bottom together with outlets in its sides. The outlets in the sides of the container are connected with air slides for the transport of materials to inlet openings arranged in the top part of the silo. Inside the container there is arranged a ring member below the centrally top-mounted inlet. The ring member is of limited vertical extension allowing materials to flow both beneath its lower edge and above its upper edge to the outlets in the sides of the container. The centrally arranged outlet is operated by a closing valve while transport out of the outlets can be operated by activating the air slides by fluidizing gas. By filling the silo in an alternating manner either through the centrally arranged outlet of the container or through the outlets in the sides of the container via the air slides to the inlet openings in the top part of the silo, batches of material of different qualities can be distributed over the cross-sectional area of the silo thus resulting in a mixing of different fraction sizes in the filling procedure of the silo. However, problems related to air induced segregation will still be present in this solution, in particular under filling operations at low material levels in the silo, i.e. under conditions where the falling height of the material will be high.

Attempts are usually made to avoid operational disturbances as a result of air-induced segregation in a silo by not emptying the silo completely. During operation, such measures mean that the problems associated with segregation are postponed as the silo gradually accumulates so much fine material that it must come out in one way or another. The options for removing it are then either to empty the silo completely and remove the fine material or to use it in the process with the risk of operating problems.

The following article, "An anti-segregation tube to counteract air current segregation", by Are Dyrøy and Gisle G. Enstad, pages 27–30, POSTEC Newsletter No. 16, December 1997, proposes a method for counteracting segregation during the filling of a silo using a central pipe (filling pipe) which extends from the top of the silo down to its bottom. The pipe is equipped with valves along its full length which are closed until filling begins. When the silo is filled, the lowest valve opens because the pressure inside the pipe is greater than that outside the pipe. In connection with the upper part of the pipe, it is possible to mount an inlet lock to prevent air accompanying the material with which the pipe is filled and to regulate the quantity fed into the pipe. This solution has proved to be effective in counteracting segregation when filling a silo.

A restriction of the arrangement described above is that the pipe, which is mounted centrally in the tank, will be exposed to large forces from the material with which the silo is filled. A further restriction is that it is difficult to use the full capacity of the silo with this arrangement as the angle of slip of the material will prevent complete filling out by the walls of the silo. Moreover, there may be a need for additional deaeration with the proposed system in order to avoid segregation on account of high air speeds during filling, in particular in connection with the handling of material which has previously been fluidized, i.e. material which contains air from prior upstream transport.

SUMMARY OF THE INVENTION

The present invention attempts to avoid the above problems. The present invention is based on the quantity of air which is fed into the silo during filling being kept to a controlled, minimal level. The present invention also causes the actual material which is fed into the silo to be distributed in a favorable manner and allows the silo to be filled more quickly. Furthermore, the present invention represents an arrangement which is more robust with regard to the stresses caused by large material movements such as slips in the silo.

BRIEF DESCRIPTION OF THE INVENTION

Figure 2:
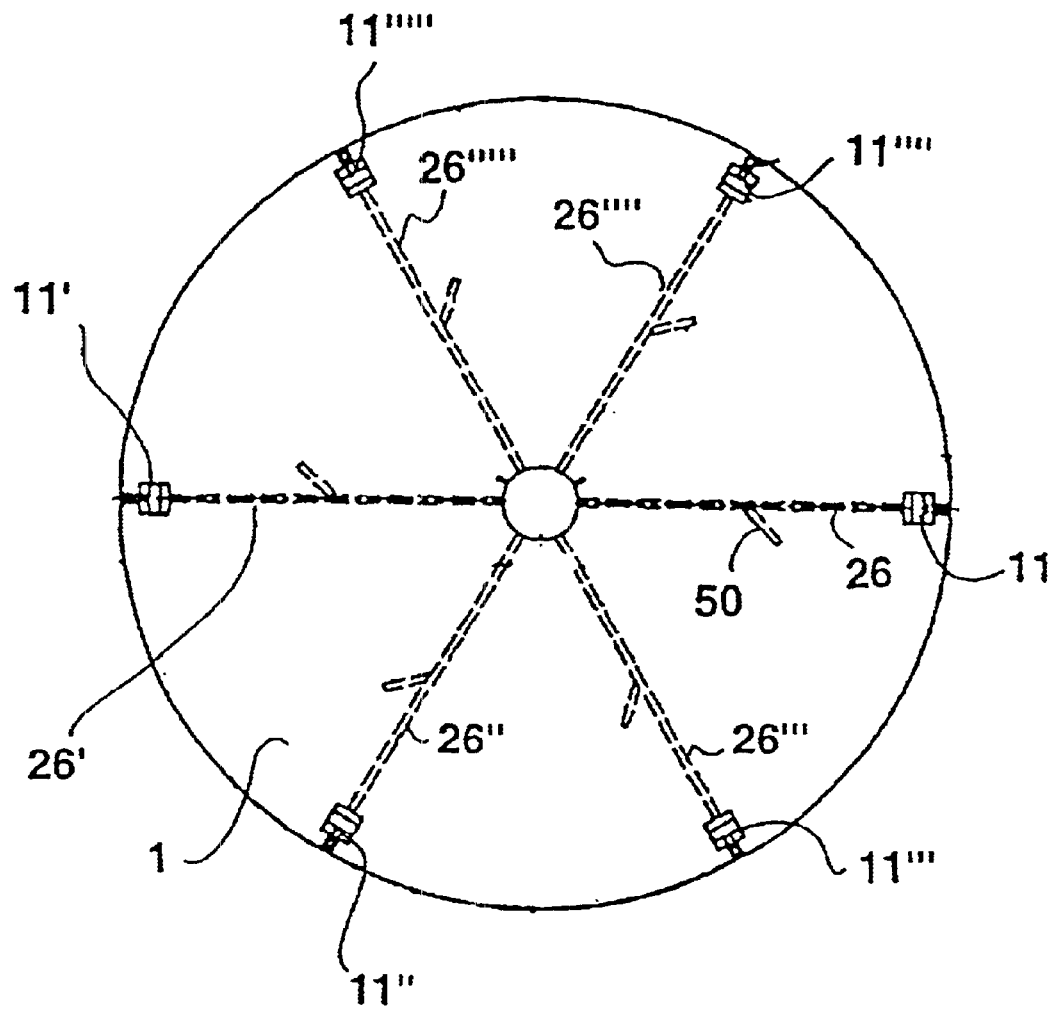

The present invention will be described in the following in further detail using the accompanying figures and examples, in which:

FIG. 1 shows an arrangement for filling a silo in accordance with the present invention; and FIG. 2 shows a section (seen from above) through a silo with an arrangement for filling a silo in accordance with the present invention.

DETAILED DESCRIPTION OF THE INVENTION

FIG. 1 shows a silo 1 with a bottom 2 and side walls 3. An arrangement 4 for filling the silo is mounted in the upper part of the silo. A vertical conveyor 5 brings material from a store 6 up to a deaeration box 7, from where a deaeration pipe 8 returns to the store. From the deaeration box 7, the material is conveyed via a conveyor 9, for example a fluidized channel or a horizontal conveyor of any type, to a central material distributor 10. One or more (two are shown in the figure) feed units 11, 11', comprising an inlet regulator or inlet lock 12, 12' and filling pipe 13, 13', may be connected to the material distributor. The inlet lock and filling pipe may be, but are not restricted to being, of the same type as stated in the above "POSTEC" article. In the figure, the inlet lock comprises a fluidizing element 14, 14', an outlet 15, 15', an inlet 16, 16' and de-aeration pipe 17, 17'. The filling pipe 13 may comprise one or more valves 18, 19 and have any cross-sectional form, square, circular, etc. The inlet lock and filling pipe are not described in detail here as they are not objects of the present invention.

The inlets 16, 16' are in connection with distributor pipes 26, 26' respectively. The distributor pipes may include slightly sloping channels, for example with an angle of 1–3°, and may comprise one or more fluidizing elements 26a, 26a' to the bottom of which compressed air or gas is supplied (not shown). The distributor pipes 26, 26' are connected to outlets 27, 27' at the material distributor 10. The material distributor shown in the figure includes a tank 29, which is preferably cylindrical. However, other geometrical forms may also be used, for example a parallelepipedic form. The tank 29 comprises an inlet 28 in its upper part through which material can be fed in from the horizontal conveyor 9. At its lower part or bottom 20, the tank shown comprises a fluidizing element 30, which fully or partially covers the bottom. The fluidizing element is connected to a source of compressed air or gas (not shown). The bottom of the tank is provided with a central outlet 32, which may expediently have a valve 31 for emptying the tank for inspection, service, etc. The bottom may expediently be conical towards the outlet and have an angle of 7°. For deaeration (removal of air) of the material which enters the tank 29, the tank is provided expediently with one or more deaeration pipes 37, 38. These pipes are preferably located in the upper part of the tank and communicate with the surrounding air. The pipes are open at their ends and may extend downwards towards the bottom of the silo. Alternatively, the pipes may be connected to the store 6.

As shown in FIG. 1, a central element 36 is mounted in the tank 29 to contribute to uniform distribution of the material when it is fed into the tank. The element 36 may comprise an upper, conical funnel device 33, which is designed to lead the material down into a pipe 34, which is preferably a cylindrical pipe. As the figure shows, the pipe 34 ends a little above the bottom 20 of the tank so that an annular opening is formed between the end of the pipe and the bottom 20. The annular opening is designed to cause material which enters the tank via the funnel device 33 and the pipe 34 to be distributed uniformly outwards in both a radial and a circumferential direction and upwards from the bottom of the tank. The flow of the material in the area between the pipe 34 and the bottom 20 is indicated with lines 35 in the figure.

The method of operation of the material distributor 10 is as follows.

The material is fed into the material distributor 10 at the inlet 28 of the tank 29 by means of the conveyor 9. The material is fed into the tank through the funnel device 33 and pipe 34 and is distributed out over the tank bottom 20. The material is fluidized (made to behave like a fluid) by means of the fluidizing element 30, and the material level in the tank 29 will rise uniformly throughout the annulus formed between the inner wall of the tank 29 and the outer wall of the pipe 34. When the level reaches the outlets 27, 27', the material will flow into the distributor pipes 26, 26' in roughly equal quantities and out into the feed units 11, 11'.

If more material is fed into the distributor 10 than the feed units 11, 11' can feed into the silo, in terms of capacity, or if the silo has been filled up so that the feed units 11, 11' are full, the distributor pipes 26, 26' will be blocked by material. In the tank, the level in the annulus between the pipe 34 and the wall of the tank will then rise until the level balances out the level inside the pipe 34. These two levels may be different. The difference in level will depend in particular on the geometrical dimensions which define the annulus between the pipe 34 and the wall of the tank, the opening between the lower part of the pipe 34 and the bottom 20 and the dimensions of the pipe. These dimensions should be chosen expediently so that the level in the annulus cannot rise above the level where the aeration pipes 37, 38 are mounted. In this situation, the pipe 34 will be filled right up to the inlet 28. As a safety measure, the aeration pipes may serve as overflows, i.e. if the filling level should exceed the design criteria, the material can be discharged via the aeration pipes 37, 38.

Depending on the type of conveyor 9 chosen, this will also gradually become full. In this situation, the vertical conveyor will begin to convey as much material down as it conveys up or it may stop. Such a stoppage can be brought about, if, for example, a vertical conveyor driven by an electric motor is used, by any increase in the motor load being monitored and a stop switch being activated if the load exceeds normal load. A person skilled in the art will be able to implement such measures and, consequently, they will not be described in further detail here. The horizontal conveyor may be fitted with equipment to monitor load, filling level, etc.

As shown in FIG. 1, the silo itself may also be fitted with means for controlled deaeration. For example, the silo may have intakes 40, 40' for surrounding air and outlets 41, 41' for the removal of air from the silo. The outlets may be connected to the store 6 and may comprise means of extraction such as fans (not shown). A cyclone or similar arrangement (not shown) may be mounted in connection with the material distributor for further deaeration of the material which is fed into the silo. The intakes and outlets may comprise valves which can be controlled in relation to measured pressure conditions in the silo and may also be controlled by means of a preprogrammed control unit. When using the feed principle on which the present invention is based, it is important to control the pressure conditions and to make the material feed as airtight as possible so that air-induced segregation can be restricted optimally.

Although, in the example described, two distributor pipes and two feed units are shown, the present invention is not restricted to these numbers. Therefore, constellations of any number of feed units will fall within the scope of the present invention. For example, the material distributor may have six distribution pipes distributed uniformly in the silo, preferably at its wall and distributed uniformly along its circumference at equal angular intervals (60°). Regardless of the choice of number of feed units, they should be located symmetrically around the center of the silo. This is because the formation of heaps in the silo should take place symmetrically to distribute the load uniformly (among other things on the base of the silo) and to prevent slides or slips which can damage the silo or the feed units. For maximum protection, the feed units should be located out at the wall of the silo or as close to it as practically possible. In this way, any slides will move away from the feed units and in towards the center of the silo, which means that the feed units can be dimensioned for lower maximum stress than if they were located more centrally in the silo.

FIG. 2 shows a section (seen from above) through a silo 1 with an arrangement for filling the silo in accordance with the present invention. In this embodiment, six feed units 11, 11', 11", 11''', 11'''', 11''''' are mounted, with associated distributor pipes 26, 26', 26", 26''', 26'''', 26''''', connected to the material distributor 10. As shown in the figure, each distributor pipe 26 can have a branch 50, which comprises a channel or a pipe which ends open towards the inner space of the silo a little way out from the distributor pipe. The function of the branch 50 is to direct material directly down into the silo if required, for example if the feed unit for the associated distributor pipe should fail or if the silo is full in the area of the feed unit. The branch is preferably mounted so that it is located approximately half a radius from the center of the silo. Moreover, the branch may have a fluidizing element which is activated by a level monitor mounted at an appropriate location in the adjoining feed unit. If the level monitor in the feed unit emits a signal which indicates that the feed unit is full, the fluidizing element in the branch 50 is activated so that material is conveyed from the branch down into the silo. In this state, the fluidizing element in the inlet lock 12 is still active while a fluidising element (not shown) located in the distributor pipe between the branch and the inlet lock is rendered inactive until the level monitor no longer indicates that the feed unit is full. With this type of control, the silo will be filled in a controlled manner and there will be a high utilization rate of the volume. Any segregation, which may occur by the material being fed into the silo from the branch, is so minimal using this method, in particular on account of the low fall height, that it can be ignored.

Moreover, the device described can advantageously be retrofitted in old silos, even silos with unfavorable geometry with regard to the possibility of air-induced segregation, so that these silos can, therefore, be operated with a lower level of segregation than was previously possible.

It should be understood that the material distributor 10 may serve plural silos. In such an arrangement the distributor may be located in the vicinity of the silos at an appropriate height where distributor pipes 26 feed material to each silo.

What is claimed is:

1. An apparatus adapted to fill a silo with a fluidizable material, said apparatus comprising:

means for conveying the material by pneumatic transport to an upper area of the silo;

an annular central material distributor including a tank having an inlet and at least one outlet;

at least one feed unit having an inlet for receiving the material from said central material distributor, and an outlet for feeding the material in a downward direction toward the bottom of the silo; and at least one distributor pipe extending from said tank outlet of said central material distributor and said inlet of said at least one feed unit.

2. The apparatus as claimed in claim 1, wherein said tank includes a fluidizing element arranged centrally at the bottom of said tank.

3. The apparatus as claimed in claim 2, wherein said inlet of said tank communicates with a pipe mounted in a center of said tank, said pipe opens downwardly so as to form an annular opening between a lower end of said pipe and said fluidizing element at the bottom of said tank.

4. The apparatus as claimed in claim 1, wherein said distributor pipe comprises a sloping channel and at least one fluidizing element on a surface of said channel.

5. The apparatus as claimed in claim 1, wherein said distributor pipe comprises a branch through which material can be conveyed directly down towards the bottom of the silo.

6. The apparatus as claimed in claim 1, wherein said feed unit and said central material distributor are provided with deaeration means.

7. The apparatus as claimed in claim 1, wherein said feed unit includes a filling pipe extending toward the bottom of the silo, and said filling pipe includes at least one valve.

8. An apparatus adapted to fill a silo with a fluidizable material, said apparatus comprising:

a conveyor which conveys the material by pneumatic transport to an upper area of the silo;

a central material distributor disposed in the upper area of the silo, said central material distributor including a tank having an inlet and a plurality of outlets;

an annular plurality of feed units disposed adjacent an upper interior wall of the silo, wherein each of said feed units has an inlet for receiving the material from said central material distributor, and an outlet for feeding the material in a direction toward the bottom of the silo; and a plurality of distributor pipes, wherein each of said distributor pipes is connected to one of said tank outlets and to one of said feed unit inlets.

9. The apparatus as claimed in claim 8, wherein said tank includes a fluidizing element arranged centrally at the bottom of said tank.

10. The apparatus as claimed in claim 9, wherein said inlet of said tank communicates with a pipe mounted in a center of said tank, and said pipe opens downwardly so as to form an annular opening between a lower end of said pipe and said fluidizing element at the bottom of said tank.

11. The apparatus as claimed in claim 8, wherein each of said distributor pipes comprises a sloping channel and at least one fluidizing element provided on said channel.

12. The apparatus as claimed in claim 8, wherein said distributor pipe comprises a branch through which material can be conveyed directly down towards the bottom of the silo.

13. The apparatus as claimed in claim 8, wherein said conveyor is provided with a deaeration unit.

14. The apparatus as claimed in claim 13, wherein said feed unit and said central material distributor are each provided with a deaerator.

15. The apparatus as claimed in claim 8, wherein each of said feed units includes a filling pipe extending toward the bottom of the silo and having at least one valve.

16. A method for filling a silo with fluidizable material, by pneumatic transport the method comprising:

conveying the material to a central material distributor disposed in an upper part of the silo, wherein the central material distributor includes an annular tank having an inlet and at least one outlet;

distributing the material towards an interior wall of the silo, from the central material distributor by means of one or more distributor pipes to one or more feed units wherein each of the feed units has an inlet for receiving the material from the central material distributor and an outlet for feeding the material in a direction toward the bottom of the silo; and distributing the material from the one or more feed units down towards the surface of the material above a bottom of the silo.

17. The method as claimed in claim 16, wherein a plurality of feed units are used, and the material is distributed uniformly between the feed units from the central area of the silo.

18. The method as claimed in claim 16, further comprising removing air or gas that is contained in the fluidizable material, while leaving a minimal amount before the material is conveyed to the central area of the silo.

19. The method as claimed in claim 16, further comprising conveying material from the one or more distributor pipes at a location between the central area of the silo and the one or more feed units so that the material at this location is conveyed directly down towards the bottom of the silo.

* * * * *